United States Patent Office 3,193,357
Patented July 6, 1965

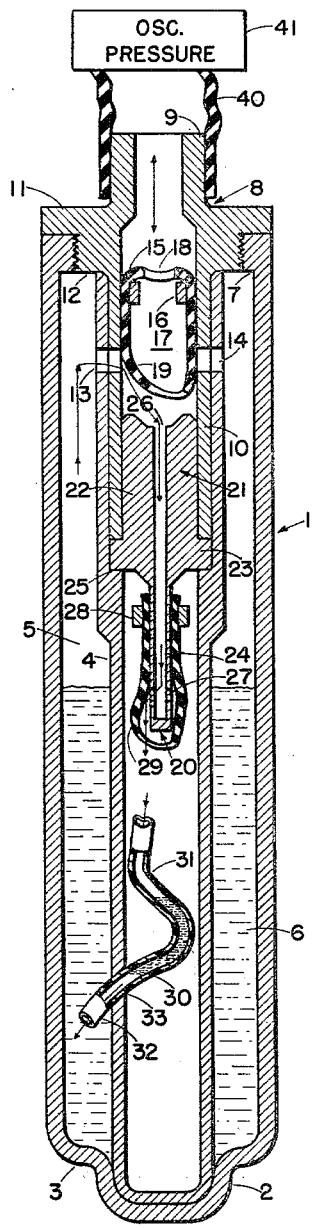

3,193,357
MINIATURIZED REACTION VESSEL WITH REACTION INJECTION MEANS, AND METHOD OF MIXING SMALL QUANTITIES OF LIQUIDS
Theodor H. Benzinger, Chevy Chase, Md., assignor to the United States of America as represented by the Secretary of the Navy
Filed Jan. 21, 1963, Ser. No. 253,007
9 Claims. (Cl. 23—230)
(Granted under Title 35, U.S. Code (1952), sec. 266)

The invention described herein may be manufactured and used by or for the Government of the United States of America for governmental purposes without the payment of any royalties thereon or therefor.

The present invention relates generally to calorimetric apparatus and procedures and, more importantly, to miniaturized reaction vessels for investigating and analyzing the heat producing characteristics of chemical and biochemical reactions and the like in small quantities of liquids.

In applicant's copending application, Serial No. 253,-008, filed January 21, 1963, there is disclosed a reaction vessel for use in the Heatburst Microcalorimeter of applicant's copending application, Serial No. 17,232, filed March 23, 1960. In this new microcalorimeter, the reaction and blank vessels are disposed in and end-to-end relationship within a cylindrical sleeve, the outer wall surface of which is completely blanketed with the "hot" junctions of a pair of "area thermopiles." The complementary "cold" junctions of these thermopiles blanket the complete inner surface of a surrounding cylindrical hollow heat sink.

In this instrument the bulk solution is accommodated in an annular space defined by a pair of concentric tubular members. This arrangement disperses the bulk solution and, more particularly, increases its heat transfer surface area.

Because of the relationship and coaction between the reaction vessels, the area thermopiles and the heat sink, the heat of reaction is rapidly discharged as a heat pulse and the passage of this pulse through the thermopile imparts to the output voltage signal a pulse wave form. Since the area thermopiles perform both as a low thermal impedance heat transfer means and a highly efficient electrical signal generating device, the above microcalorimeter possesses an extremely high sensitivity to instantaneous reactions, an improved speed of response to changing rates of heat flow and a greater insensitivity to inertial distortions and external temperature disturbances. Moreover, no mixing and stirring devices are required with this microcalorimeter. Only gravitational forces are employed to perform these functions, and even the relatively small amount of heat introduced by these pulses can be ascertained by repeating the original mixing motions after thermal equilibrium has been established and recording the voltage wave forms so generated.

In many calorimetric investigations involving chemical and biochemical reactions, it is desirable to work with even smaller quantities, a few milliliters of bulk solution and microliter amounts of a second reactant. For with less heat capacity per unit surface area of reaction vessel, the response is more rapid. The speed of paper transport of the instrument's recorder can, therefore, be increased to yield larger recording areas for the same amount of evolved heat. This, of course, improves the accuracy of the data interpretation and, in turn, leads to a further reduction in the quantity of substance necessary for an analysis.

In applicant's heatburst microcalorimeter, the difference in the specific gravity of air and the reactant liquids is utilized in the mixing and stirring operations. Motions in the gravitational field produce the necessary mixing forces. However, with a further reduction in volume and dimensions of the vessel for miniaturization, difficulties arise with respect to first keeping separated, and then moving and mixing, liquids in capillary spaces.

In exploring the possible use of capillary devices for retaining and mixing extremely small quantities of fluids, it was discovered, as related in applicant's copending application, Serial No. 253,008, that liquids and gases in alternation tend to flow more freely in narrow, annular spaces than in open capillaries. For example, the flow in a one-millimeter annular space was observed to be superior to that in an open capillary of three-millimeter diameter. It was further found that air bubbles in capillaries as wide as two millimeters do not move or rise upwardly when trapped below a liquid column contained therein. They do, however, rise in elongated, annular spaces between two concentric, cylindrical surfaces.

To exploit the above discovery, the miniaturized reaction vessel above disclosed took the form of a pencil-like tubular element sealed off by a combination end cap and dropholder. Within this tubular element a concentric, cylindrical core is positioned, the narrow annular space defined by the outer surface of this core and the inner wall surface of the capillary serving as the bulk container of reactant liquid.

Within this capillary space, according to one preferred embodiment of the present invention, the bulk solution containing one of the reactants is accommodated. A second reactant of smaller quantity is temporarily accommodated in a capillary within the core of this annular space. To mix the two reactants, air from the unoccupied portion of the reaction vessel is circulated through this core which injects the reactant out into the bulk solution while the injected air is re-introduced into the unoccupied portion of the vessel. The force necessary to circulate this air is provided by minute, frequent oscillations of air pressure introduced from the outside without any net influx of external air and without loss of internal air. Since condensation takes place during the compressional portion of each cycle and evaporation occurs during the expansion portion, the enthalpy changes caused by these alternating events cancel out.

When the reaction vessel of the present invention is inverted after injection of the reactant, the air originally above the bulk solution becomes trapped below a liquid column of this bulk solution. Immediately thereafter, this air in the form of an air bubble rises up through the column. Even with an annular space of one or two millimeters, the movement of this air bubble is attended with very little difficulty because of the phenomenon previously mentioned. As the air bubble travels upwardly towards the free surface of the liquid column, it acts as a moving air plunger, pushing the previously injected, second reactant through the complete bulk solution and mixing it therewith. In order to thoroughly mix the various substances participating in the reaction under investigation, the reaction vessel need only be subjected to a number of such inversions.

The primary object of the present invention is to provide a miniaturized reaction vessel for microcalorimetric apparatus and procedures.

Another object of the present invention is to provide a new and novel method for injecting reactants into bulk solutions without introduction of external solids, liquids or gases.

A still further object of the present invention is to provide a reaction vessel for containing milliliter amounts of one reactant as bulk material and microliter amounts of solution containing a second reactant.

A yet still further object of the present invention is to provide a reaction vessel where a bulk solution is accommodated in an annular space and a second reactant is accommodated within the core of this space for thermal protection.

A still further object of the present invention is to provide a reaction vessel wherein a reactant accommodated therein is injected into a bulk solution also accommodated therein with a minimum amount of thermal disturbance.

A yet still further object of the present invention is to provide a reaction vessel wherein air from the unoccupied portion of the vessel is utilized to mix two different fluids accommodated therein, without introduction of external air.

A still further object of the present invention is to provide a reaction vessel wherein the fluids accommodated therein are brought together by an air flow which takes place within said vessel.

Other objects, advantages and novel features of the invention will become apparent from the following detailed description of the invention when considered in conjunction with the accompanying drawing.

Referring now to this drawing, the single figure of which has been enlarged for clarity of illustration, the reaction vessel of the present invention comprises an outer tube 1 having a central depression 2 formed in its bottom end wall 3 for retaining the bottom end of an inner, concentric tube 4. Tubes 1 and 4 may be made out of stainless steel with their inner and outer wall surfaces, respectively lined completed with gold or any other noble metal for minimizing surface reaction phenomena at these sites. Depression 2, it will be recognized, serves to center inner tube 4. In doing so, it insures the presence of an annular space 5 of uniform width between the outer wall surface of inner tube 4 and the inner wall surface of outer tube 1 for accommodating the bulk solution 6.

Outer tube 1 is provided with an internal flange 7 adjacent to its open end which is threaded to receive a cover or closure plate 8. This plate has an external sleeve portion 9, an internal sleeve portion 10 and an intermediate flange 11, a reduced diameter portion of which, 12, has a matching thread cut therein for cooperating with the thread formed in flange 7. When cover plate 9 is threaded into place, annular space 5 is effectively sealed off from the core of the reaction vessel except for an air passageway therebetween which is opened intermittently, as will be seen hereinafter, when the reactant is being injected into the bulk solution.

Cut through sleeve 10 and the upper wall of inner tube 4 are a multiplicity of matching holes 13 and 14. These apertures, together with a section of flexible tubing 15 held in place within the upper portion of sleeve 10 by a circular collar 16, form an upper, one-way air valve 17 which permits air from the unoccupied portion of the annular space, under certain conditions, to flow into the upper portion of inner tube 4. Tubing 15, which is the control element of this valve, has a small aperture 18 in its top end wall. Its other end, 19, is almost completely open. Normally, the lower flap portion 19 of this tubing contacts the confronting inner wall surface of sleeve 10. Apertures 13 and 14 are thus closed as a consequence of this contact, and annular space 5 thereby isolated from the rest of the vessel. However, when the pressure within the upper portion of sleeve 10 drops below that in annular space 5, this flap portion moves inwardly or collapses to the position shown and valve 17 shifts to its open condition.

Also positioned within inner tube 4 is a lower, one-way air valve 20 having as one component thereof a member 21 which possesses a cylindrical barrel portion 22 that intimately fits within sleeve 10, an external flange portion 23 and a needlelike extension 24. When the vessel is assembled, flange 23 is clamped between the lower end of sleeve 10 and an internal flange 25 cut in the inner wall of tube 4. A central bore 26 passes down almost the complete length of member 21 and communicates with a multiplicity of apertures 27 cut near the bottom end wall of extension 24. Fitting over this extension and held in place by a ring 28 is a section of flexing tubing 29. This tubing, like its counterpart in valve 17, controls the operation of valve 20. Normally, tubing 29 contacts the outer wall surface of the needlelike extension 23, closing off the various apertures 27 and isolating the upper portion of tube 4 from its lower portion. However, when the pressure within bore 26 exceeds that within the lower portion of tube 4, this tubing becomes distended and switches the valve to its open condition. Air can then pass into the lower portion of tube 4 to carry out the reactant-injection operation.

The second reactant 30 is accommodated within a capillary 31, most of whose length is housed within the lower portion of inner tube 4. Capillary 31 may be a fine polyethylene tubing or any thin, flexible tubing possessing similar physical and chemical characteristics. A short terminating end portion 32 of this capillary projects through an aperture 33 formed in the lower wall of tube 4 into the annular space 5 normally occupied by the bulk solution 6 when the reaction vessel is primed.

In order to inject the reactant 30 into the bulk solution 6 without introducing thermal disturbances into the apparatus, the present invention cyclically varies the air pressure in the upper portion of tube 4. When this pressure increases, it will be appreciated, upper air valve 17 remains closed since flap portion 17 continues to contact the inner portion of sleeve 10. However, lower air valve 20 shifts to its open condition because of the distension of the lower flap portion of tubing 29. When this pressure decreases, air valve 17 opens and air valve 20 closes for reasons which should be obvious.

When the air pressure is lowered in the upper portion of tube 4 and valve 17 opens, air from the main annular space 5 is sucked into this portion of tube 4 via apertures 13 and 14. This air, however, does not pass into the lower portion of tube 4 containing capillary 31 until the next cycle of positive pressure.

It will thus be seen that when a cyclically varying pressure is coupled to the reaction vessel air valves 17 and 20 operate sequentially and an intermittent, unidirectional flow of air takes places from the unoccupied portion of the annular space into the lower portion of tube 4. As the pressure builds up within this portion of tube 4, a part and then all of the second reactant 30 is pushed into bulk solution 6.

Because of the action of valves 17 and 20, there is no air flow needed from the oscillating pressure source to carry out this injection operation. Consequently, there is no exchange of heat or water vapor from the outside to the inside of the vessel.

In order to couple the pressure oscillations to the reaction vessel, a flexible capillary 40 made of a thermally nonconducting material may be fitted over the external sleeve 9 of cover plate 8 with the remote end thereof terminating at a suitable cyclically varying pressure source 41. To avoid thermal disturbances, this pressure source preferably should be accommodated within the main heat sink of the calorimeter.

The procedure for preparing the reaction vessel for insertion into the core of the heatburst microcalorimeter is as follows: First, a metered amount of a first reactant or bulk solution is placed within outer tube 1 by means of a pipette or burette. This is done, of course, with all the other components removed therefrom. Next, the second reactant is injected into capillary 31 by means of a micro syringe at a site such that a column of air of suitable length exists on each side thereof. These air columns insure the isolation of the reactant from the other fluids in the system. After these preliminary filling operations are completed, the barrel portion 22 of member 21 is inserted into the lower sleeve 10 of cover plate 8. Next, inner tube 4 with capillary 30 in place is slipped over these two components. And, finally, this subassembly is lowered into outer tube 1 and cover plate 8 threaded in place.

During this last operation, bulk solution 6 rises and fills annular space 5 to an intermediate level which can be anywhere below the location of apertures 13 and 14.

After the reaction vessel is assembled, it is carefully inserted upright into the cylindrical core with the thermopile of the heatburst microcalorimeter. When thermal equilibrium is obtained, that is, when the thermopile output is at approximately the zero voltage level, intermittent pressures are applied to the vessel for a few seconds to inject the second reactant into the bulk material in the manner above described. Following this, the calorimeter is inverted. As mentioned hereinbefore, this inversion causes the air in the annular space above the bulk solution to be first trapped at the bottom of the vessel and then rise as an air bubble throughout the complete length of the liquid column, mixing the second reactant with the bulk solution as it proceeds upwardly. After this initial mixing operation, the calorimeter can be inverted several more times to insure the complete and uniform distribution of all the particles involved in the reaction.

When the reaction vessel is inverted from the position shown in the drawings, it would normally be expected that some of the bulk solution would enter capillary 31 and flow into the inside of inner tube 4. However, this flow does not take place because of the relatively small diameter of the capillary and the phenomenon previously discussed.

In the operation of the microburst calorimeter, a blank vessel of identical construction with its own affiliated area thermopile around it is accommodated side by side with the reaction vessel in the same common block or heat sink for the reasons described in application Serial No. 17,232. It will be appreciated that the oscillating pressure is applied to both vessels simultaneously and the inversions for mixing, of course, occur identically and simultaneously in the reaction vessel and in the blank. Heat changes due to these occurrences will, therefore, produce similar potentials in the two thermopiles which are canceled out by the serial and opposite electrical connections of the two thermopiles.

As mentioned hereinbefore, the flow of gases and liquid in annular spaces is superior to that in capillaries of equivalent size. However, it has been experimentally determined that for best results the annular space should have an inner diameter exceeding 1.25 millimeters. This dimension appears to be critical for reasons presently unknown.

In one preferred embodiment of the present invention, the annulus had an inner diameter of two millimeters and an outer diameter of four millimeters, and the reaction vessel had a length of approximately twelve centimeters. This gave the vessel the size and shape of a pencil. Because of its relatively small over-all diameter, the vessel's end losses were of a tolerable level.

While it should be obvious to those skilled in the art that a wide assortment of mechanisms may be resorted to for developing the varying pressure mentioned hereinbefore, nevertheless, it would be noted that this condition may be produced very simple, for example, by a bellows sealing sleeve 9 or tubing 40 and cyclically driven from its neutral position, or by an electrically operated piston cyclically displaced within a sleeve 9 or within a cylinder communicating with tubing 40, or by various other equivalent electromechanical arrangements.

It should also be appreciated that the capillary tubing 31 should be made preferably of a material which has a non-wetting characteristic with respect to the reaction fluid 30 accommodated therein and that any well-known sealing means can be used to insure a fluid-tight seal at the point where this tubing passes through the wall of inner tube 4.

Obviously many modifications and variations of the present invention are possible in the light of the above teachings. It is therefore to be understood that within the scope of the appended claims the invention may be practiced otherwise than as specifically described.

What is claimed is:

1. Apparatus for mixing a first fluid with a second fluid with a minimum amount of thermal disturbance comprising
    a vessel having an enclosed annular shaped fluid storage compartment;
    a capillary tube disposed within the core of said compartment and having one end thereof communicating with said compartment;
    and means coupled to the core of said compartment for directing air out of that portion of said compartment, which is unoccupied when said compartment is partially filled with a first fluid, into said core thereby to inject a second fluid accommodated within said capillary tube into said compartment.

2. In an arrangement as defined in claim 1 wherein the bore of said capillary tube is destricted so as to prevent a substantial liquid flow therethrough by gravitational forces.

3. In combination,
    a reaction vessel having an outer and innter tubular wall, the inner surface of said outer wall and the outer surface of said inner wall defining an annular storage compartment with a hollow core;
    a capillary tube positioned within said hollow core and extending through said inner wall into said annular storage compartment, a removable cover closing said annular storage compartment and making it fluid-tight;
    a first fluid within said capillary tube;
    and means for establishing a unidirectional flow of air from said annular storage compartment into said hollow core thereby to force said first liquid into said annular storage compartment where it mixes with a second fluid contained therein.

4. A reaction vessel having
    a first and second compartment;
    a fluid passageway interconnecting said compartments, said passageway including a section whose size is restricted so as to preclude a liquid flow therethrough by gravitational forces;
    and means for building up the pressure within one of said compartments from air withdrawn from the other compartment to force a first fluid accommodated in said one compartment into said other compartment via said passaegway to mix with a second fluid contained therein.

5. In combination, a reaction vessel, said vessel having a main enclosed annular compartment extending substantially the complete length thereof for accommodating a first liquid substance;
    a section of capillary tubing disposed within the core of said annular compartment;
    one end of said tube communicating with said compartment;
    and means for pumping air from said compartment into said core to force a second liquid substance accommodated within said tubing into said compartment to mix with said first liquid substance.

6. In a method for mixing a first fluid with a second fluid with a minimum amount of thermal disturbance, the steps of
    placing said first fluid in an enclosed compartment which forms said first fluid into an annular column with an air space thereabove;
    placing said second fluid in a pressure operated storage element which is positioned in the center of said column and which communicates with said column;
    pumping air from said air space into the storage element to inject said second fluid into said column;
    and inverting said vessel so that the air above said column first becomes trapped below said column, then rises up therethrough as an air bubble to mix said first and second fluids.

7. Apparatus for mixing a first fluid with a second fluid with a minimum amount of thermal disturbance comprising, in combination, a vessel having first and second concentric compartments,
    said first compartment being closed and said second compartment being opened;
a capillary tube interconnecting said compartments;
and mens coupled to the open end of said second compartment for pumping air from said first compartment into said second compartment and for creating a pressure level within said second compartment greater than that within said first compartment whereby a second fluid accommodated within said capillary tube is forced into said first compartment to mix with a first fluid stored therein.

8. A reaction vessel comprising, in combination,
a first tubular member closed at one end thereof;
a second tubular member closed at one end thereof;
said second tubular member being disposed within said first tubular member with the closed end thereof in contact with the closed end of said first tubular member whereby the inner and outlet walls of said first and second tubular members, respectively, form an annular compartment;
means for closing off the top of said annular compartment;
a first valve controlling the flow of fluid between the top of said annular compartment and the inside of said second tubular member at a location adjacent the open end thereof,
    said valve being normally closed and opening only when the pressure within said second tubular member is less than that within said annular compartment;
a second valve positioned within said second tubular member and controlling the flow of fluid between the open end thereof and the closed end thereof,
    said second valve being normally closed and opening when the pressure at the open end of said second tubular member exceeds that at the closed end thereof;
a capillary tube positioned within said second tubular member adjacent the closed end thereof,
    one end of said tube extending into said annular compartment,
    said capillary tube serving as a retainer for a second liquid;
and means for creating a cyclically varying pressure at the open end of said second tubular member whereby said first and second valves are operated sequentially to pump air from said compartment into the closed end of said second tubular member to force said second fluid into said annular compartment to mix with a first fluid accommodated therein.

9. A reaction vessel comprising, in combination,
a first tubular vessel having a central depression formed in its bottom end wall;
a second tubular vessel positioned within said first tubular vessel with its bottom end accommodated within said central depression;
the inner side wall surface of said first vessel and the outer side wall surface of said second vessel defining an annular compartment with one end open, the other end of said compartment being closed by the bottom wall portion of said first vessel that is between the lower side wall portion of said first vessel and said central depression;
a removable closure plate cooperating with said first and second vessels for making said annular compartment fluidtight;
a first one-way valve controlling the flow of fluid between an upper portion of said annular compartment and an upper portion of said second tubular vessel;
a capillary tube positioned in a lower portion of said second tubular vessel,
    said capillary tube passing through a lower side wall portion of said second tubular vessel and extending into a lower portion of said annular compartment;
a second one-way valve positioned within said second tubular vessel at a point intermediate said capillary tube and said first one-way valve,
    said second one-way valve when closed isolating the lower portion of said second tubular vessel from the upper portion thereof,
    said first one-way valve being normally closed and opening when the pressure in the upper portion of said second tubular vessel is less than the pressure in said annular compartment;
    said second one-way valve being normally closed and opening when the pressure in the upper portion of said second tubular vessel is greater than the pressure in the lower portion thereof;
and means coupled to the open end of said second tubular vessel for opening said first and second valves sequentially whereby air within said annular compartment is withdrawn therefrom through said first one-way valve into the upper portion of said second tubular vessel and thereafter transmitted into the lower portion thereof through said second one-way valve to increase the pressure in the lower portion of said second tubular vessel and force any fluid accommodated in said capillary tube into the lower portion of said annular compartment.

References Cited by the Examiner
UNITED STATES PATENTS

| | | | |
|---|---|---|---|
| 1,535,927 | 4/25 | Look | 220—17 X |
| 1,714,197 | 5/29 | Tourtellotte | 23—230 |
| 1,986,196 | 1/35 | Grosse | 23—290 |

OTHER REFERENCES

E. Calvet, and H. Prat, Microcalorimetric, Masson et Cie., Paris, 1956, pages 151, 222 and 233.

Attree et al., "Differential Calorimeter of the Tian-Calvet Type," in the Review of Scientific Instruments, vol. 29, Number 6, June 1958; pages 491–496.

MORRIS O. WOLK, *Primary Examiner.*

JAMES H. TAYMAN, JR., *Examiner.*